United States Patent [19]

Ohnishi et al.

[11] Patent Number: 4,933,977
[45] Date of Patent: Jun. 12, 1990

[54] METHOD FOR IDENTIFYING PLURAL CONNECTED FIGURES

[75] Inventors: Kazuhiko Ohnishi; Shoji Miki; Yasuo Fujita; Hirofumi Kameyama, all of Himeji; Katsuji Uosaki, Kobe, all of Japan

[73] Assignee: Glory Kogyo Kabushiki Kaisha, Hyogo, Japan

[21] Appl. No.: 247,663

[22] Filed: Sep. 22, 1988

[30] Foreign Application Priority Data

Nov. 5, 1987 [JP] Japan .................. 62-280087

[51] Int. Cl.$^5$ .............................................. G06K 9/50
[52] U.S. Cl. ......................................... 382/9; 382/13; 382/22; 382/26
[58] Field of Search .................... 382/9, 11, 13, 26, 22

[56] References Cited

U.S. PATENT DOCUMENTS

| 3,930,228 | 12/1975 | Spanjersberg | 382/9 |
| 4,045,773 | 8/1977 | Kadota et al. | 382/9 |
| 4,635,290 | 1/1987 | Tsuji et al. | 382/9 |
| 4,654,873 | 3/1987 | Fujisawa et al. | 382/9 |
| 4,731,857 | 3/1988 | Tappert | 382/9 |
| 4,764,972 | 8/1988 | Yoshida et al. | 382/13 |

Primary Examiner—David K. Moore
Assistant Examiner—Yon Jung
Attorney, Agent, or Firm—Wenderoth, Lind & Ponack

[57] ABSTRACT

A method for identifying a plurality of handwritten connected figures includes identifying and prioritizing branches of the connected figures. A first recognition block is formed extending a predetermined distance from one end of the connected figures. Branches having the lowest priority within the first recognition block are erased until a recognizable figure is obtained within the first recognition block. Then, a second recognition block is formed extending the predetermined distance from the recognizable figure obtained in the first recognition block. As with the first recognition block, the branches having the lowest priority within the second recognition block are erased until a recognizable figure is obtained within the second recognition block.

6 Claims, 8 Drawing Sheets

FIG. 7(A)
FIG. 7(B)    FIG. 7(C)
FIG. 7(D)
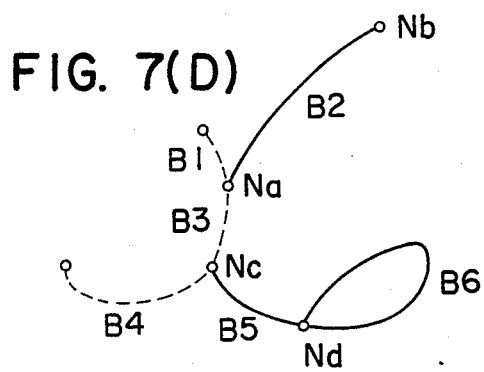

(IMPOSSIBLE TO RECOGNIZE)

SEGMENTATION (IMPOSSIBLE TO RECOGNIZE)

SEGMENTATION (RECOGNITION — "O")

[REMAINED BRANCH]

SEGMENTATION

RECOGNITION — "2"
RECOGNITION — "3"

RESULT

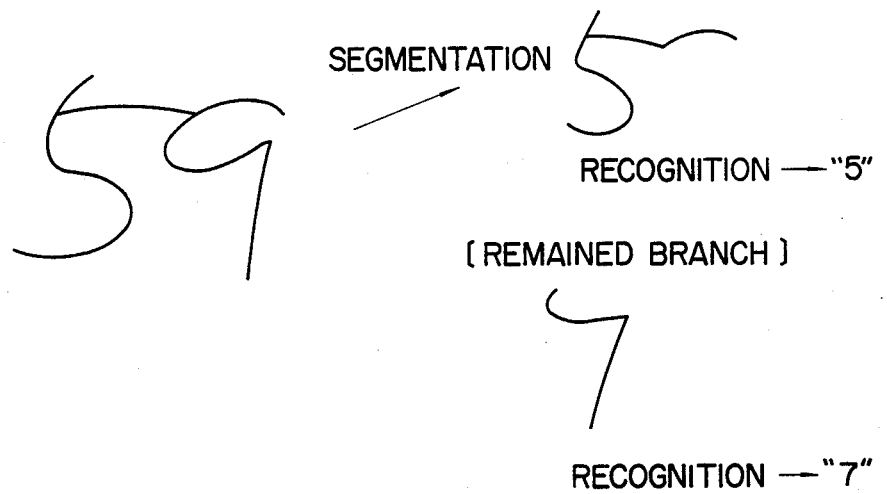
FIG. 9
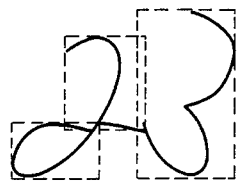  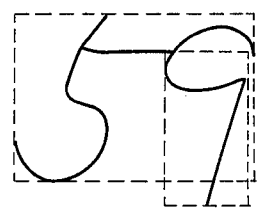
FIG. 10A  FIG. 10B

METHOD FOR IDENTIFYING PLURAL CONNECTED FIGURES

BACKGROUND OF THE INVENTION

This invention relates to a method for separating continuously scrawled hand-written numerical figures so as to secure efficient recognition thereof.

A recognition method for reading out one numeral written within a predetermined frame has been almost completely established in the optical character reader (OCR) technology. However, the level of presently available systems is not sophisticated enough to recognize numerical figures which were written by a writer who did not expect his or her numerals to be read by an OCR. Numerical figures (hereinafter referred to as "numerical figures written by hand in free-pitch without a frame") of plural bits which are hand-written freely in a large frame in which the writer did not expect the figures to be read out by an OCR system, tend to be running and continuous to each other. There has been no method publicly known which can efficiently discriminate such scrawled connected numerical figures, and demands have mounted for the development of such a technique.

SUMMARY OF THE INVENTION

This invention was conceived to solve such problems encountered in the prior art, and aims at providing a method for efficiently discriminating between contacted running letters and recognizing letters (numerical figures) written by hand in free-pitch without a frame and connected to each other.

BRIEF DESCRIPTION OF THE DRAWINGS

In the accompanying drawings:

FIGS. 3 and 5 through 10A and 10B are views explaining this invention.

DESCRIPTION OF THE PREFERRED EMBODIMENTS

Figure 1:
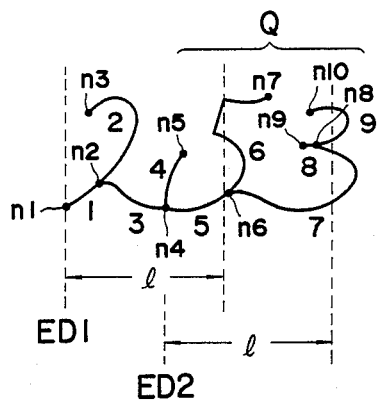
FIG. 1 is a diagram for explaining the principle of a method for separating connected letters according to this invention.

According to this invention as shown in FIG. 1, hand-written numerical figures which are scrawled continuously are divided into nodes n1 through n10 comprising end points, or branch-out points and branches 1 through 9 comprising line segments which connect nodes n1 through n10. At the same time, blocks are set from one end ED1 to a predetermined distance (distance 1 in this embodiment) for reading, and unnecessary branches are erased from each block. A numerical figure in the first block is recognized first and then the second block is set from another end ED2 to the distance 1. In this manner, hand-written letter patterns are consecutively and successively recognized. The data in the form of hand-written numerical figures read out by a means such as an image sensor are pre-processed by smoothing or narrower line processing to prepare a series of connected linear graphics, which are then analyzed in structure, and expressed by concepts of nodes and branches. In recognizing a general structure by using codes, effective blocks of a single figure or connected numerical figures are extracted and used as a candidate block(s). As shown in FIG. 1, one candidate block comprises three connected letters. The distance 1 may be determined to be a value, for instance, obtained by multiplying the mean height of the plural blocks with a constant (e.g. 1.30). If any of the blocks is impossible to be recognized as a single character, it is further segmented. Branches are consecutively erased in a predetermined order to prepare a candidate letter. The segmenting method should satisfy the following conditions 1 and 2.

Condition 1: $|xBl_{min} - xBrmin| < 1$

Condition 2: Numer of branches $\leq$ Maximum number of letter branch wherein: $xBl_{min}$ denotes the minimum value in the x-direction of the candidate block, $xBr_{min}$ denotes the minimum value in the x-direction of the branch, and the maximum number of branches of a letter is determined as the maximum branch number prepared as the numerical figure recognition code.

In the recognition process, a condidate letter is designated by starting from a combination with the maximum number of branches and successively eliminating branches of the maximum branch with x-weight until a letter is recognized. Once a letter is recognized successfully, the blocks comprising the rest of the branches are sequentially segmented and recognized until there no longer remains blocks of subsequent branches. Then, the processing step proceeds to the next candidate block. If the size of a candidate block is detected as being smaller than a predetermined value in the processing, it is rejected as recognition is impossible. In case a part of a branch is found during the segmentation process, such a branch should be interpolated. Upon completion of the processing, all the blocks are processed for rejecting portions erroneously read out because of excessive segmentation by judging from the overall arrangment of the letters.

Figure 2A:
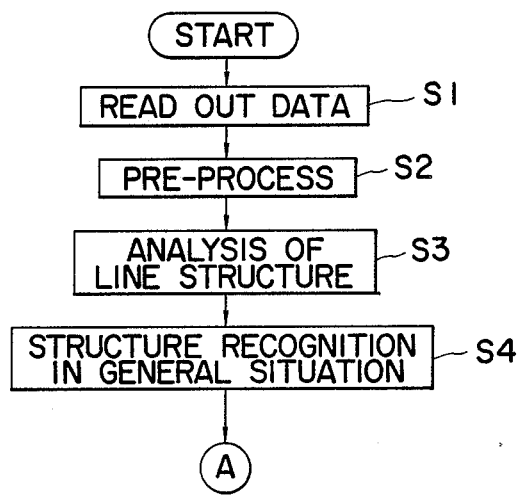
FIGS. 2A and 2B and FIGS. 4A and 4B are flow charts showing the operation of this invention method for separating connected letters.
Figure 2B:
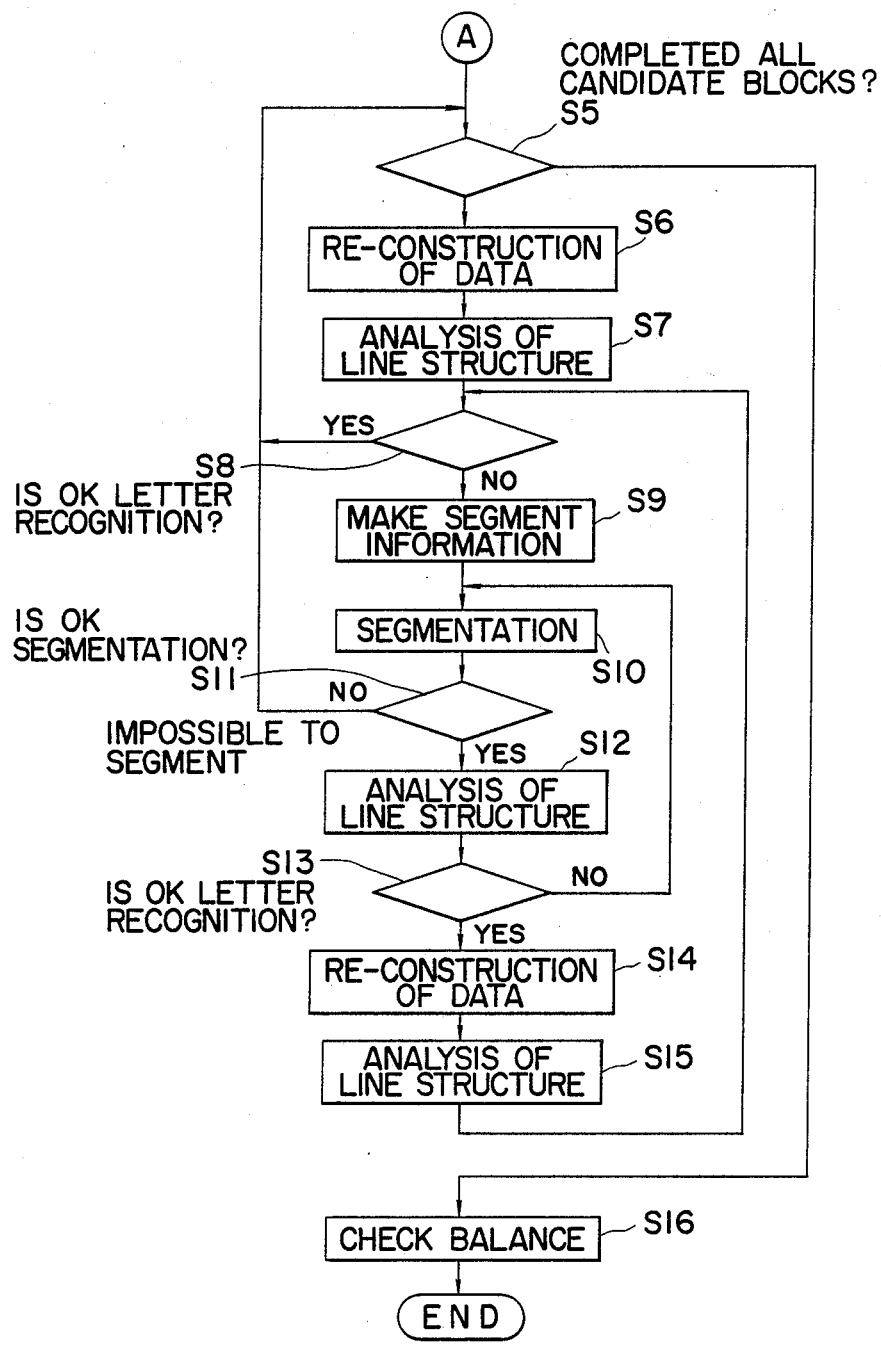
Figure 3:
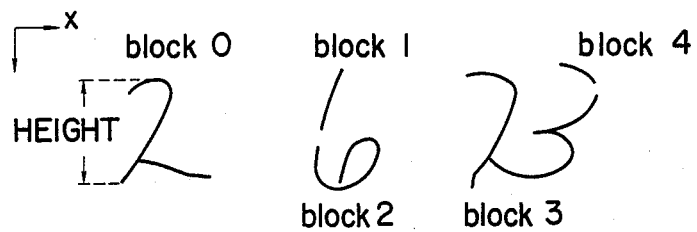

FIGS. 2A and 2B are flow charts of the processing steps according to this invention. After reading out the data (Step S1), a pre-processing step such as smoothing or narrower line processing is conducted (Step S2). The linear structure is analyzed into the three elements of loop, arc and straight line (Step S3). The blocks are judged in general structure recognition to extract candidate blocks having more than one letter (Step S4). FIG. 3 shows examples of candidate blocks wherein block 0 is a candidate block comprising one character, but in blocks 1 and 2 a character is judged to be two separate blocks since a part of the character is blurred. When it is latter judged to connect the separated character after examining the distance between the weights and a positional relation of the blocks, the blocks 1 and 2 are united again to form one (a second) candidate block. The blocks 3 and 4 are similarly judged to form one (third) candidate block. Those shown in FIG. 1 form one candidate block as a whole. It is judged whether or not all the candidate blocks are recognized (Step S5), and if not, the steps described below will be repeated until all of the candidate blocks are recognized.

Figure 4A:
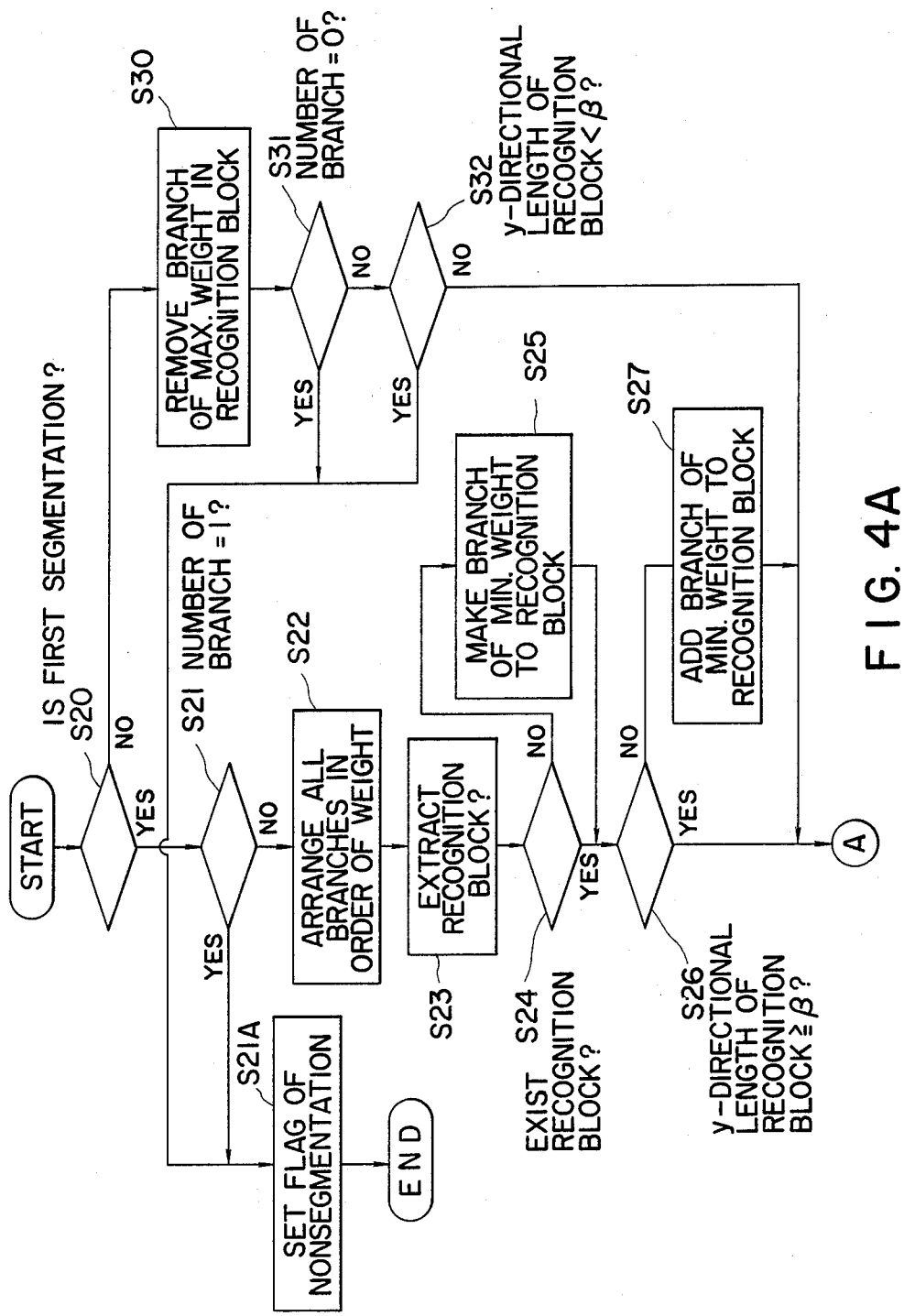
Figure 4B:
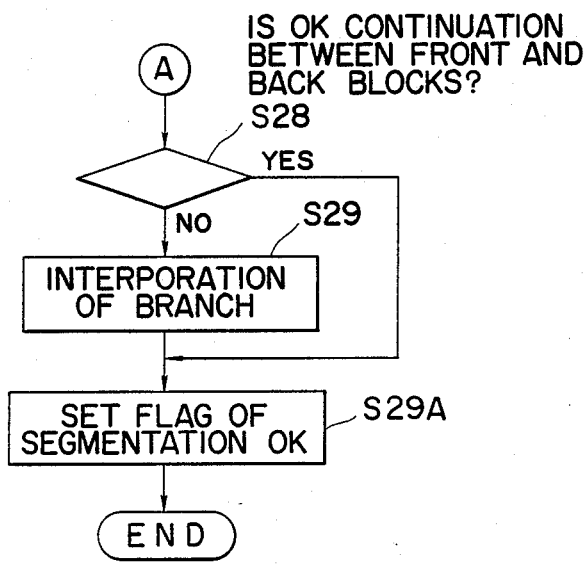

If any candidate blocks exsit, data are reconstructed for each of the candidate blocks (Step S6). Since at the Step S6, short branches which are judged noises are eliminated or certain blocks are united, changes are caused in the linear structure. Blocks are therefore analyzed again in the linear structure by using the nodes and the branches (Step S7), and then judged if they are recognizable as a letter (Step S8). If not recognizable, segment information on factors necessary for a segmentation such as the position of the weight of a branch, and the size of the outer frame of each candidate block is prepared (Step S9). They are subjected to segmentation process subsequently (Step S10). FIGS 4A and 4B show flow charts of the segmentation process in detail and the description of the steps will be given hereinafter. After the processing it is judged whether or not segmentation is possible (Step S11), and if not, this indicates the numerical figure within the candidate block is impossible to recognize. The processing step proceeds to the next candidate block. If the segmentation is judged possible, the data for each segment is loaded for analysis of their linear structure (Step S12), and then the block is judged as to whether or not a letter is recognizable (Step S13). If not, the process retuns to the above Step S10. If a letter is recognizable at the Step S13, the remaining parts of the candidate blocks formed with the branches other than the ones used for the above recognition are analysed for linear structure and their data are reconstructed (Steps S14 and S15). The process returns to the above Step S8 to judge whether or not the remaining parts can be recognizable as a letter. If not, the Steps S9 and thereafter are repeated.

The segmentation process accroding to this invention will now be described referring to the flow charts in FIGS. 4A and 4B.

For each candidate block it is judged whether or not this segmentation process is being conducted for the first time (Step S20), and if it being conducted for the first time, it is judged whether or not the number of branches of the candidate block is "1" (Step S21). If the number is "1", there is no need for segmentation, and a flag for non segmentation is set to complete the process (Step S21A). Parting from the steps shown in FIG. 4A, the process returns from the Step S11 and to the Stpe S5 in FIG. 2B to start recognition of the next candidate block. If the number of branches is not "1", all the branches within the candidate block are re-arranged in the order weight in the direction x (Step S22). For instance, when the candidate block is the one shown in FIG. 1, all the branches are re-arranged in the order of the weights in the direction x, or in the order of the branches 9, 8, 7, 6, 5, 4, 3, 2 and 1. Confirmed blocks to be confirmed are then extracted from the one end ED1 thereof for the distance l as shown in FIG. 1. The block to be confirmed means a block which is the subject of recognition (Step S23). The predetermined distance l is determined by multiplying a mean height of all the candidate blocks with a constant. For example, if the mean height of all the candidate blocks is assumed to be "A", it is obtained by the expression of $1.30 \times A = l$. The extraction of a recognition block means to the extraction of branches which have the x-weight within the distance l. In FIG. 1, they are the five branches 1, 2, 3, 4 and 5. In other words, by the first segmentation process, one block comprising the branches 1 through 5 is recognized as the recognition block.

Figure 5:
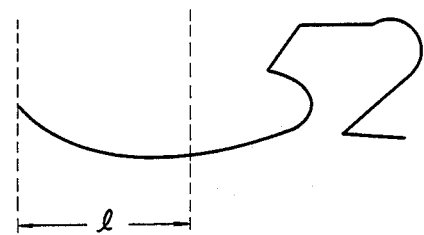
Figure 6:
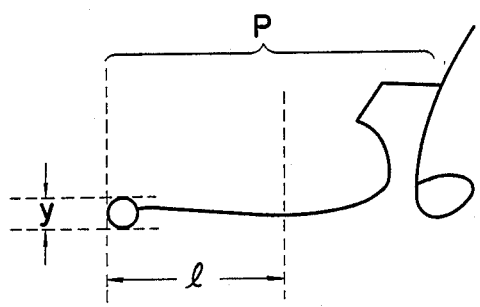

Then, the presence or absence of the recognition block is judged (Step S24). In the candidate block as shown in FIG. 5, there is judged no branches having a weight within the distance l from the one end (since the weight of the branch $5$ lies to the right of the scope of l), the recognition block is judged absent, and the branch having the minimum weight in the direction of x is judged a recognition block (Step S25). Then, it is judged whether or not the length of the recognition block in the direction y is larger than the predetermined value $\beta$ (Step S26). Taking an example of the candidate block shown in FIG. 6, the only branch having a weight within the distance l is a loop on the left side (since the P section of $5$ lies to the right of the scope l), and the block should necessarily be judged not one letter. A branch outside of the recognition block but having the minimum weight in the direction x is added to the recognition block S27). Then, the thus obtained recognition block and the block obtained by removing the above recognition block from the candidate block are judged as to whether or not the branches are continued (Step S28). If they are not continuous, the branches are interpolated (Step S29), a flag to complete segmentation is set (Step S29A), and the process proceeds from the Step S11 to the Step S12 in FIG. 2B.

The interpolation of branches means herein to add the branches in subsequent blocks as shown in FIG. 7C because when two connected letters as shown in FIG. 7A are segmented by the above method, the letter tends to miss a part thereof as shown in FIG. 7B, and the letter recognized in the subsequent processing as a letter. More specifically, if the branches and the nodes of the parts related to interpolation are denoted with numerals and letters as shown in FIG. 7D, the left branch continuous to the node within the recognition block and the branches and the nodes in a right block other than the recognition block are obtained as indicated in Table 1. It is then judged whether there is any duplication in branches on the left side which are continuous to the node within the recognition block. In this example, the branch B3 is duplicated. Then, the nodes on both sides of the duplicated branch are examined, and if they are not the same node, the branch is interpolated.

TABLE 1

| Belonging to the right side blocks other than the recognition block | | Left side branches continuing to the nodes within the |
|---|---|---|
| branch | node | recognition block |
| B2 | Na | B1, B3 |
|  | Nb | — |
| B5 | Nc | B3, B4 |
|  | Nd | — |
| B6 | Nd | — |

In this example, the nodes on both sides of the branch B3 are Na and Nc which are not identical to each other, and therefore, the branch B3 should be interpolated. If they are identical, it is judged a loop, and there is no need for interpolation.

In the flow charts of FIG. 4A and 4B, the recognition block is designated for each candidate block, and when no letter is recognized in the Step S13 in FIG. 2B where a flag of segmentation OK is set, the processing returns again to the steps shown in FIGS. 4A and 4B. The candidate block is segmented for the second time at Step S20. Since all the information necessary to rearrange all the branches in the direction x in the order of weights have already been stored during the first segmentation, the steps will simple be removing one branch which has the maximum weight in the x-direction to and from a new recognition block (Step S30), and judging whether or not the number of branches becomes "0" (Step S31). If there is no branch remaining after one branch is removed at the Step S30, the flag of non segmentation is set to end the processing steps. However, if any branch is left, it is judged if the length of the new recognition block in the y-direction is less than the vlaue β or not to be (Step S32), and if so, it is judged not one letter, and the non segmentation flag is set to end the steps. If the value is greater than β, the process proceeds to Step S28 to repeat the aforementioned operations.

Taking as an example the candidate block shown in FIG. 1, the branches of the first recognition block are "1, 2, 3, 4 and 5", those of the second recognition blocks are "1, 2, 3 and 4" and those of the third recognition blocks are "1, 2 and 3". Recognition of a letter becomes possible only at this stage. When the numeral 2 is recognized, data is reconstructed for the branches other than branches "1, 2 and 3" at the Step S14 in FIG. 2B, and the data is analysed for the linear structure at the Step S15, and it is judged whether a Q section is recognizable or not at the Step S8. In this case, the Q section is not recognizable, and the process proceeds to the Step S9 to prepare segment information. Further, the segmentation is conducted at the Step S10.

If there are any other blocks than the one shown in FIG. 1, similar processings are conducted for the rest of the candidate blocks. When all the condidate blocks have been subjected to the recognition, balance checking is lastly performed (i.e. the Step S16 in FIG. 2B). This balance checking is performed in order to prevent erroneous recognition due to either excess or insuficient segmentation. More particularly, the balance of a letter is judged in size or arrangment for an ordinary horizontally written letter. FIG. 8 shows an example of the excessive segmentation, which results in the recognition of "023". FIG. 9 shows an example of insufficient segmentation, which results in the recognition of "57". When the balance is checked for those characters, as shown in FIGS. 10A and 10B, their balance as an ordinary horizontally written letter becomes somewhat abnormal, and the results of the recognition are processed as "recognition impossible". In this manner, erroneous recognition is prevented.

In the foregoing statement, a plural number of branches are first subjected to the processing as a recognition block and are successively rejected one by one because numerical figures are generally simple graphically (e.g. the numeral "1"), the probability of recognizing a part of another letter as "1" is high.

Although in the above description, blocks are extracted from the left end of a hand-written numerals and branches are erased for recognition in the order starting from the greater x-weight, the extraction may be conducted from the right end conversely or the branches may be erased starting from those of minimum weight. For the extraction of recognition blocks, branches having the weight within the distance l are extracted in the foregoing, but all the branches which continue to the nodes within the distance l may be used as the first recognition block.

As described in the foregoing statement, according to this invention character separation method, hand-scrawled contacted running letters may be cut out into predetermined blocks, and branches are consecutively erased to effect recognition in the unit of one letter. This method can interpolate missing segments caused by erasing of th branches to realize accurate recognition of letters and numerical figures.

It is should be understood that many modifications and adaptations of the invention will become apparent to those skilled in the art and it is intended to encomplass such obvious modifications and changes in the scope of the claims appended hereto.

What is claimed is:

1. A method for identifying figures of a candidate block, the candidate block containing a plurality of connected figures and extending in width from a first end to a second end, said method comprising the steps of:
    (a) identifying and prioritizing branches of the plurality of connected figures, wherein branches closest to the first end of the candidate block are given a relatively higher priority than branches closest to the second end of the candidate block;
    (b) dividing the candidate block into a first recognition block extending a predetermined distance from the first end of the candidate block;
    (c) determining whether a recognizable figure exists in the recognition block; and, in the absence of a recognizable figure in the recognition block,
    (d) erasing a branch having a lowest priority within the recognition block and returnig to step (c).

2. A method as recited in claim 1, further comprising the steps of:
    checking a continuity of the branches within the recognition block to determine if portions of the branches within the recognition block are missing; and, if portions of the branches within the recognition block are missing,
    interpolating selected branches within the recognition block to establish the portions of the branches that are missing.

3. A method as recited in claim 1, wherein the predetermined distance in step (b) is obtained by multiplying a mean height of plural candidate blocks by a constant.

4. A method as recited in claim 3, wherein the constant is on the order of 1.3.

5. A method as recited in claim 1, further comprising the steps of:
    dividing the candidate block into a second recognition block extending the predetermined distance from a branch having a highest priority which was erased in step (d) with respect to the first recognition block; and,
    repeating steps (c) and (d) with respect to the second recognition block.

6. A method as recited in claim 5, wherein the predetermined distance is greater than a minimum width of the candidate block minus a minimum width of a branch in the candidate block.

* * * * *